US007584500B2

(12) United States Patent
Dillon et al.

(10) Patent No.: US 7,584,500 B2

(45) Date of Patent: Sep. 1, 2009

(54) PRE-FETCHING SECURE CONTENT USING PROXY ARCHITECTURE

(75) Inventors: Doug Dillon, Gaithersburg, MD (US); Ricardo Belmar, Centreville, VA (US); Seejo Sebastine, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 866 days.

(21) Appl. No.: 10/963,194

(22) Filed: Oct. 13, 2004

(65) Prior Publication Data

US 2005/0108517 A1 May 19, 2005

Related U.S. Application Data

(60) Provisional application No. 60/523,240, filed on Nov. 19, 2003.

(51) Int. Cl.
*H04L 9/00* (2006.01)
*H04L 9/32* (2006.01)

(52) U.S. Cl. ............................ 726/3; 713/151; 713/154

(58) Field of Classification Search ..................... 726/3; 713/151, 154

See application file for complete search history.

(56) References Cited

U.S. PATENT DOCUMENTS 6,052,730 A 4/2000 Felciano et al.
6,081,900 A 6/2000 Subramaniam et al.
6,658,463 B1 12/2003 Dillon et al. ................ 709/219
2002/0007415 A1 1/2002 Douglis et al.

FOREIGN PATENT DOCUMENTS

EP 1 333 642 A2 1/2003
EP 1 398 714 A2 3/2004
WO WO 00/29990 5/2000
WO WO 01/03398 A2 11/2001
WO WO 02/48830 6/2002
WO WO 03/007575 A1 1/2003

OTHER PUBLICATIONS

Using signatures to improve URL routing Genova, Z.; Christensen, K.J.; Performance, Computing, and Communications Conference, 2002. 21st IEEE International Apr. 3-5, 2002 pp. 45-52.*

Redirection algorithms for load sharing in distributed Web-server systems Cardellini, V.; Colajanni, M.; Yu, P.S.; Distributed Computing Systems, 1999. Proceedings. 19th IEEE International Conference on May 31-Jun. 4, 1999 pp. 528-535.*

(Continued)

*Primary Examiner*—David Y Jung

(74) *Attorney, Agent, or Firm*—K&L Gates, LLP

(57) ABSTRACT

Requests for secure content are rewritten before delivering the secure content to a client. In one implementation, the rewritten requests include the information content from the original request with the addition of a predetermined domain. The domain may correspond to a trusted agent that acts as a proxy for all secure requests from the client. Because of the rewritten request, the trusted agent is contacted by the client for the secure content. The trusted agent may then transparently (from the point of view of the client) retrieve and forward the secure content to the client.

14 Claims, 12 Drawing Sheets

OTHER PUBLICATIONS

EXWEB: remotely operating devices in the home network Yoshida, R.; Inoue, A.; Hiraishi, J.; Shigeno, H.; Matsushita, Y.; Networked Appliances, 2002. Gaithersburg. Proceedings. 2002 IEEE 4th International Workshop on 2002 pp. 267-274.*

"Secure Web Tunneling", Computer Networks and ISDN Systems 30 (1998) 531-539, Martin Abadi et al. pp. 531-539.

George Apostolopoulos et al.; Securing Electronic Commerce: Reducing the SSL Overhead; IEEE Network; Jul./Aug. 2000; pp. 8-15.

* cited by examiner

PRE-FETCHING SECURE CONTENT USING PROXY ARCHITECTURE

RELATED APPLICATIONS

This application claims priority under 35 U.S.C. §119(e) based on U.S. Provisional Patent Application (Ser. No. 60/523,240) filed Nov. 19, 2003, entitled "WEB ACCELERATION IN A BROADBAND SATELLITE SYSTEM FOR SECURE WEB PAGES"; the entirety of which is incorporated herein by reference.

BACKGROUND OF THE INVENTION

A. Field of the Invention

The present invention relates to a communication system, and is more particularly related to retrieving secure web content using proxy servers.

B. Description of Related Art

The maturity of electronic commerce and acceptance of the Internet as a daily tool by a continually growing user base of millions of users intensifies the need for communication engineers to develop techniques for enhancing network performance. With the advances in processing power of desktop computers, the average user has grown accustomed to sophisticated multimedia applications, which place tremendous strain on network resources (e.g., switch capacity). Also, because the decrease in application response times is a direct result of the increased processor performance, the user has grown less tolerant of network delays, demanding comparable improvements from the network infrastructure. Therefore, network performance enhancing mechanisms are needed to optimize efficiency and reduce user response times. These mechanisms are imperative in systems with relatively high network latency, such as a satellite network.

FIG. 1 is a diagram of a conventional communication system for providing retrieval of web content by a personal computer (PC). PC 101 is loaded with a web browser 103 to access the web pages that are resident on web server 105; collectively the web pages and web server 105 may represent a "web site." PC 103 may connect to a wide area network (WAN) 107, which is linked to the Internet 109. The above arrangement is typical of a broadband connection. Other connection types include dial-up connections (not shown) to the Internet 109 for access to the Web. The phenomenal growth of the Web is attributable to the ease and standardized manner of "creating" a web page, which can possess textual, audio, and video content.

Web pages are formatted according to the Hypertext Markup Language (HTML) standard which provides for the display of high-quality text (including control over the location, size, color and font for the text), the display of graphics within the page and the "linking" from one page to another, possibly stored on a different web server. Each HTML document, graphic image, video clip or other individual piece of content is identified, that is, addressed, by an Internet address, referred to as a Uniform Resource Locator (URL).

In a typical transaction, the user enters or specifies a URL to the web browser 103, which in turn requests a URL from the web server 105 using the HyperText Transfer Protocol (HTTP). The web server 105 returns an HTML page, which references numerous embedded objects (i.e., web content), to the web browser 103. Upon receiving the HTML page, the web browser 103 processes the page to retrieve each embedded object. The retrieval process requires the establishment of separate communication sessions (e.g., TCP (Transmission Control Protocol) connections) to the web server 105. That is, after an embedded object is received, the TCP connection is torn down and another TCP connection is established for the next object. Given the richness of the content of web pages, it is not uncommon for a web page to possess 30 or more embedded objects. This arrangement disadvantageously consumes network resources, but more significantly, introduces delay to the user.

Delay is further increased if the WAN 107 is a satellite network, as the network latency of the satellite network is typically longer than terrestrial networks. In addition, because HTTP utilizes a separate TCP connection for each transaction, the large number of transactions amplifies the network latency. Further, the manner in which frames are created and images are embedded in HTML requires a separate HTTP transaction for every frame, compounding the delay.

It is often desirable to transmit certain web content between the end-user and the web server in a secure manner. Web-based electronic commerce applications are an example of a class of applications in which sensitive financial information is transmitted over the web. The secure HTTP (HTTPS) protocol is often used to securely transmit such information. An HTTPS session is essentially an HTTP connection established over a Secure Socket Layer (SSL) connection. SSL is a well known protocol for encrypting data sent between clients and servers.

HTTPS connections require additional network overhead to set-up and maintain. Accordingly, in networks in which latency is an issue (e.g., satellite networks), HTTPS connections can even further exacerbate latency.

Based on the foregoing, there is a clear need for improved approaches for retrieval of content within a communication system.

SUMMARY OF THE INVENTION

One aspect of the invention includes a method for retrieving content for a client. The method includes receiving a reference to secure content accessed via a first resource and editing the reference to the secure content to redirect requests for the secure content to a trusted agent, the edited reference to the secure content including information that identifies the first resource and the secure content of the received reference. The method further includes forwarding the edited reference to the client and requesting the secure content from the first resource, by the trusted agent on behalf of the client, when the client requests the edited reference.

Yet another aspect of the invention is a method that includes intercepting a HyperText Markup Language (HTML) document from a content server in response to a request from a user, editing the HTML document to insert a predetermined domain within secure HyperText Transfer Protocol (HTTPS) links before an original domain name included in the HTTPS links, and forwarding the edited HTML document to the user.

Yet another aspect of the invention is directed to a system that includes a first proxy configured to receive a request from a user for a secure connection with a content server and a second proxy configured to accept a first secure connection with the first proxy and to establish a second secure connection with the content server. The system additionally includes a wide area network configured to connect the first proxy and the second proxy.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Techniques for supporting a pre-fetch proxy service to retrieve content, such as web content, are described. In the following description, for the purposes of explanation, numerous specific details are set forth in order to provide a thorough understanding of the present invention. It is apparent, however, to one skilled in the art, that the present invention may be practiced without these specific details or with an equivalent arrangement. In other instances, well-known structures and devices are shown in block diagram form in order to avoid unnecessarily obscuring the present invention.

Although concepts consistent with the present invention are described with respect to a satellite network, and secure HTTP, it is recognized by one of ordinary skill in the art that the present invention has applicability to other wide area networks (WANS) and data protocols. In particular, although many of the secure connections will be described herein as SSL connections, other encryption protocols, or other versions of SSL, such as the Transport Layer Security (TLS) protocol, may instead be used. Further, although the concepts below are generally discussed in relation to web content, concepts consistent with the invention can be applied to other areas, such as VPN solutions, firewall solutions, bandwidth reduction through compression solutions, and more generally, any situation in which transmitting secure content through an intermediary to perform some type of filtering operation is useful.

Communication System Overview

Figure 1:
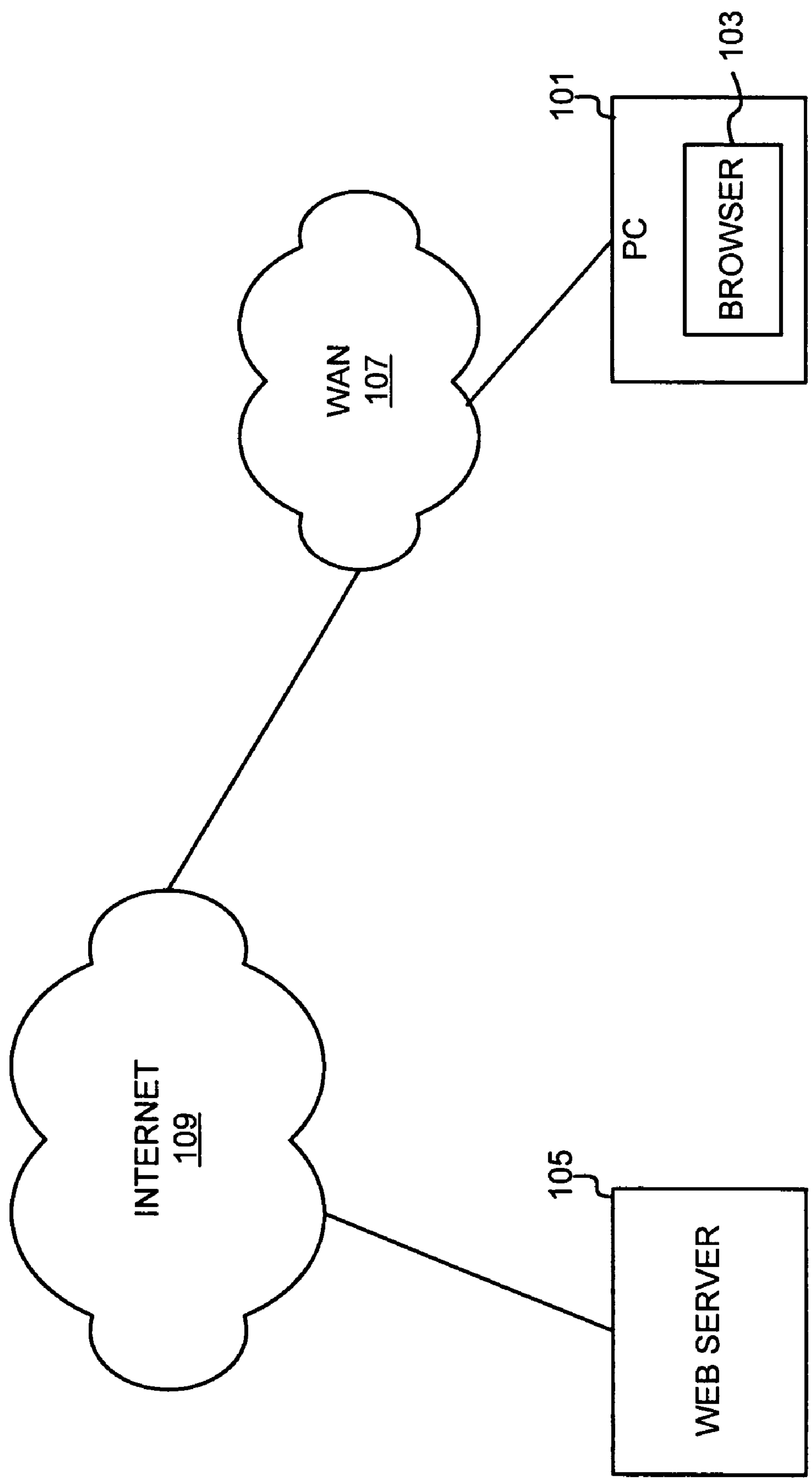
FIG. 1 is a diagram of a conventional communication system for providing retrieval of web content by a personal computer (PC).
Figure 2:
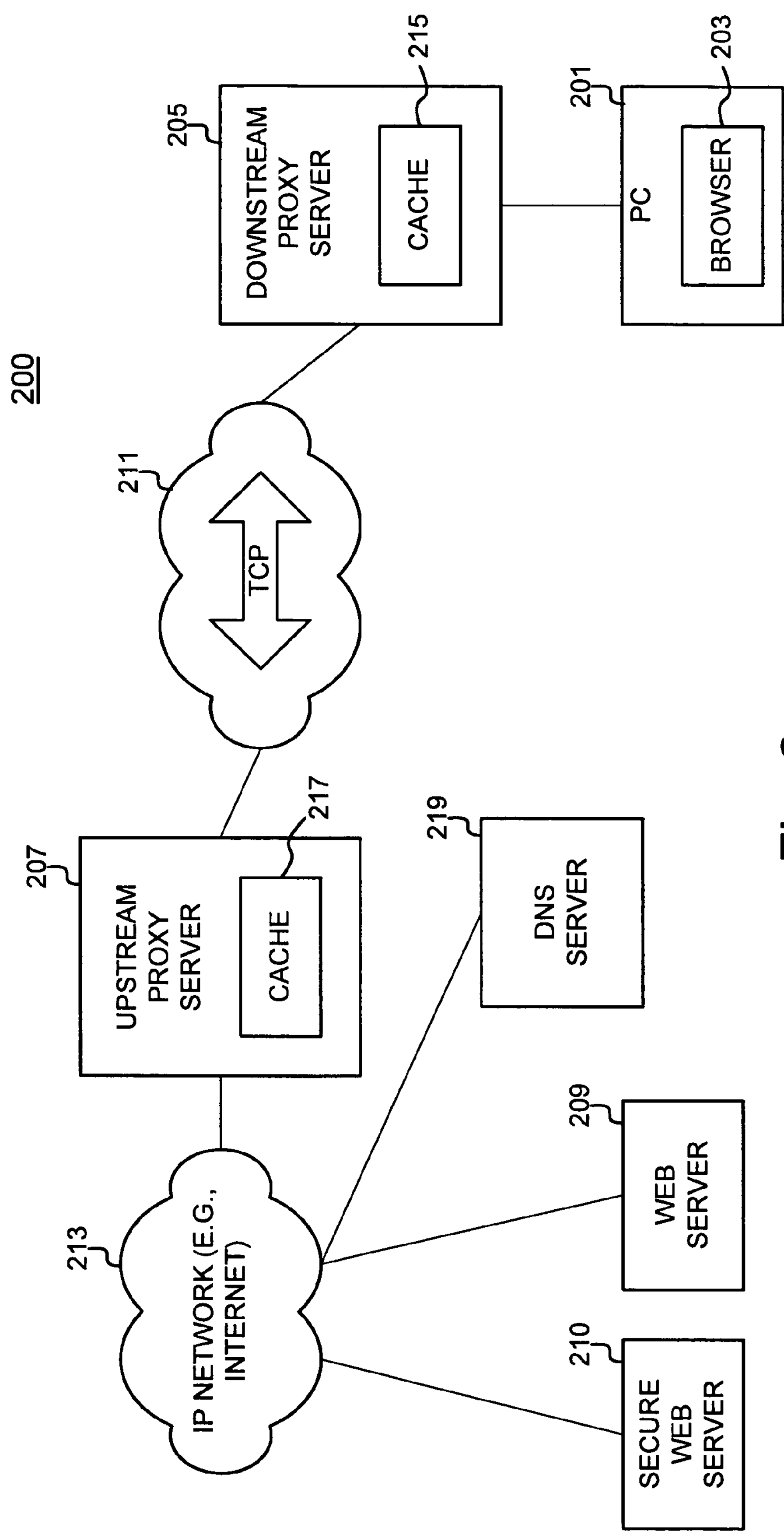
FIG. 2 is an exemplary diagram of a communications system capable of supporting a pre-fetch process via upstream and downstream proxies, according to an embodiment of the present invention.

FIG. 2 shows a diagram of a communications system capable of supporting a pre-fetch process via upstream and downstream proxies, according to an embodiment of the present invention. Communication system 200 includes a user station 201 that utilizes a standard web browser 203 (e.g., Microsoft® Internet Explorer, Netscape® Navigator). In this example, the user station 201 is a personal computer; however, any computing platform may be utilized, such as a workstation, web enabled set-top boxes, wireless Personal Digital Assistant (PDA), "webified" (i.e., web enabled) cell phone, web appliances, etc. Web pages are often formatted according to the Hypertext Markup Language (HTML) standard which provides for the display of high-quality text (including control over the location, size, color and font for the text), the display of graphics within the page and the "linking" from one page to another, possibly stored on a different web server. Each HTML document, graphic image, video clip or other individual piece of content is identified, that is, addressed, by an Internet address, referred to as a Uniform Resource Locator (URL). As used herein, a "URL" may refer to an address of an individual piece of web content (HTML document, image, sound-clip, video-clip, etc.) or the individual piece of content addressed by the URL. When a distinction is required, the term "URL address" refers to the URL itself while the terms "web content", "URL content" and "URL object" refer to the content addressed by the URL.

Communication system 200, in an exemplary embodiment, uses two proxy servers 205, 207, which are referred to as a downstream proxy 205 and an upstream proxy 207, respectively. As used herein, the terms "upstream" and "downstream" refer to the flow of content from a content server (e.g., a web server) to the client. According to one embodiment of the present invention, the terms upstream proxy and downstream proxy comply with the definitions specified in the Internet Engineering Task Force (IETF) Request for Comment (RFC) 2616 (HTTP 1.1). That is, the proxy closer to the web server is termed the upstream proxy, while the proxy closer to the web browser 203 is termed the downstream proxy.

Figure 3:
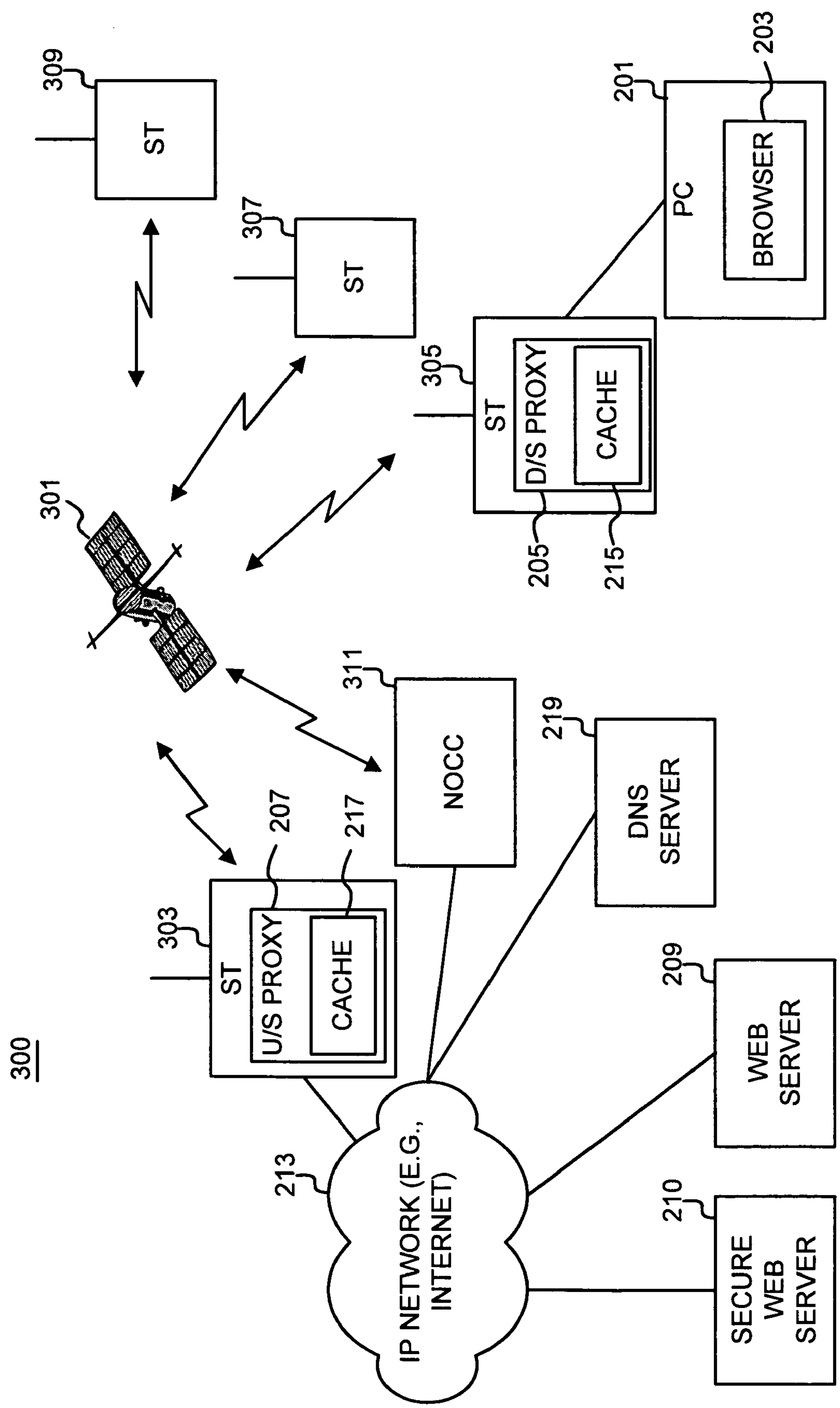
FIG. 3 is an exemplary diagram of a satellite communication system capable of supporting a pre-fetch process in accordance with an embodiment of the present invention.

PC 201 connects to the downstream proxy 205, which communicates with the upstream proxy 207 through a wide area network (WAN) 211. According to an embodiment of the present invention, the WAN 211 is a VSAT (Very Small Aperture Terminal) satellite network (as shown in FIG. 3). Alternatively, the network 211 may be any type of WAN; e.g., ATM (Asynchronous Transfer Mode) network, router-based network, T1 network, etc. The upstream proxy 207 has connectivity to an IP network 213, such as the Internet, to access a web server 209/210.

The proxy servers 205 and 207, according to an embodiment of the present invention, operate as a distributed HTTP proxy server with special HTTPS proxy server capabilities. They may communicate using Transmission Control Protocol (TCP) connections, in which multiple TCP connections may be used to support parallel HTTP/HTTPS transactions. In addition, the proxies 205 and 207 can communicate using persistent connections (e.g., as specified by HTTP 1.1). Use of persistent connections enables a single TCP connection to be reused for multiple requests of the embedded objects within a web page associated with the web servers 209/210. Additionally, the TCP Transaction Multiplexing Protocol (TTMP) may be utilized to further enhance network efficiencies. The TTMP protocol is a known protocol that allows multiple transactions, such as HTTP transactions, to be multiplexed onto one TCP connection. The TTMP protocol is described in more detail in, for example, U.S. Pat. No. 6,658,463 to Douglas M. Dillon et al. HTTP is an application level protocol that is employed for information transfer over the Web. These proxy services (or functions) may also be resident entirely within the host 201 or within a router or satellite terminal, or a combination thereof.

DNS server 219 may perform Domain Name System (DNS) lookup functions for IP network 213. Through DNS, domain names, such as "broker.com," are mapped to their official Internet Protocol (IP) addresses (e.g., IPv4 or IPv6 addresses).

The web browser 203 can access URLs either directly from the web server 209/210 or through proxy servers 205 and 207. A web page (e.g., HTML page) may refer to various source documents by indicating the associated URLs. As discussed above, a URL specifies an address of an "object" in the Internet 213 by explicitly indicating the method of accessing the resource. A representative format of a URL is as follows: "http://www.hns.com/homepage/document.html." This example indicates that the file "document.html" is accessed using HTTP. The URL "https://www.hns.com/homepage/document.html" indicates that the file "document.html" is accessed using HTTPS.

Web servers are shown in FIG. 2 as a regular (non-secure) web server 209 and a secure web server 210. Web server 209 may be dedicated to serving non-encrypted web pages over HTTP while secure web server 210 may be dedicated to serving secure web pages over HTTPS. In practice, the functions of web server 209 and 210 may be combined and implemented by a single web server.

Upon receiving the HTML page, the web browser 203 may process the page to retrieve each embedded object. The retrieval process requires the establishment of separate communication sessions (e.g., TCP (Transmission Control Protocol) connections) to the web server 209/210. That is, after an embedded object is received, the TCP connection is torn down and another TCP session is established for the next object. Given the richness of the content of web pages, it is not uncommon for a web page to possess a large number (e.g., over 30) of embedded objects; thereby consuming a substantial amount of network resources, but more significantly, introducing delay to the user. The establishment of the TCP connection takes one round trip traversal of the WAN 211 and then the requesting of the URL and receiving its response takes another round trip traversal.

Delay is of a particular concern in the system 200 if the WAN 211, in an exemplary embodiment, is a satellite network, in that the network latency of the satellite network is conventionally longer than terrestrial networks. To minimize such delay, system 200 may provide a transparent pre-fetch proxy service. That is, this service reduces response time by processing HTML document responses and by fetching and forwarding objects over the network 211 in such a way that they are delivered to the browser 203 as soon as possible by the downstream proxy server 205. This process is referred to as pre-fetching a URL. Under this scenario, the upstream proxy server 207, which is on the web server side of the WAN 211 identifies the objects embedded in the HTML page, and pre-fetches such objects from the web server 209. Alternatively, objects can be identified to pre-fetch based on other techniques, such as historical information relating to browsing patterns. The upstream proxy server 207 forwards the pre-fetched objects across the WAN 211 towards the web browser 203 to the counterpart downstream proxy server 205 from which the web browser 203 can retrieve the objects without transmitting a message (e.g., GET message) across the WAN 211. These pre-fetched objects may be stored in the respective caches 215 and 217. Upstream cache 217, in particular, may not be included in upstream proxy server 207, and the pre-fetched objects may always be directly forwarded to downstream proxy server 205.

The downstream proxy server 205 can deliver a pre-fetched URL to the browser 203 immediately if the URL was delivered to the downstream proxy server 205 after the downstream proxy's reception of a request for the URL from the browser 203. This process of pre-fetching non-secure web documents using HTTP proxy servers is described in more detail in the patent application "SYSTEM AND METHOD FOR PRE-FETCHING CONTENT IN A PROXY ARCHITECTURE," application Ser. No. 10/659,481, filed Sep. 10, 2003, the contents of which are hereby incorporated by reference. When WAN 211 is a relatively high-latency network, such as a satellite-based network, pre-fetching content can significantly reduce perceived latency and thus improve the user's web browsing experience.

The proxy pre-fetching techniques described above are not directly applicable to HTTPS connections. In an HTTPS connection, communication links between browser 203 and web server 210 are encrypted. Accordingly, proxy servers 205 and 207 are not able to read the secure web pages transmitted between browser 203 and web server 210, and are thus unable to pre-fetch web pages that the user is likely to select.

Consistent with an aspect of the invention, proxy servers 205 and 207 implement an SSL bridging technique through which proxy servers 205 and 207 maintain SSL protection of communications between the browser and the server on every network link the communication traverses, while still being able to pre-fetch secure documents.

Exemplary Satellite Communication System

FIG. 3 shows a diagram of an exemplary satellite communication system in accordance with an embodiment of the present invention. In particular, the system of FIG. 3 illustrates a specific implementation of the system of FIG. 2, in which the WAN 211 is a satellite system 300, which includes a satellite 301 that supports communication among satellite terminals (STs) 303, 305, 307, and 309. System 300 employs a Network Operations Control Center (NOCC) 311 to manage and control communication services and operations. For example, the NOCC 311 provisions and identifies the channels that are to be allocated.

In an exemplary embodiment, the STs 303, 305, 307, and 309 are Very Small Aperture (VSAT) terminals. Under this architecture, users can communicate from one ST to another ST directly with one satellite hop.

Although the downstream proxy 205 is shown within the ST 305, it is contemplated that the downstream proxy 205 can also reside within the PC 201.

SSL

Before describing the HTTPS pre-fetching techniques performed consistent with aspects of the present invention, aspects of the SSL protocol will be briefly discussed in order to facilitate a more complete understanding of the invention. SSL enables encrypted, authenticated communications across public networks such as the Internet. In the context of a web page, a particular URL is designated as a link that should be implemented using the SSL protocol by beginning links with the "HTTPS" designation. For example, when a user of browser 203 selects the link "HTTPS://www.abc.com," browser 203 will attempt to establish an SSL connection with the web server (host) at "abc.com."

The SSL protocol is composed of two main components: the SSL handshake protocol and the SSL record protocol. The handshake protocol is responsible for authenticating communicating devices to each other. It is also entrusted with the job of negotiating encryption and message authentication algorithms along with the required keys. SSL allows the session state to be cached. If a client needs to set up a new SSL session while its session state is cached at the server, it can skip the steps involving authentication and key exchange and reuse the cached session state to generate a set of keys for the new session. The record protocol provides two basic security services: privacy and message integrity.

Operation of Proxy Servers in Pre-Fetching Secure Documents

Figure 4:
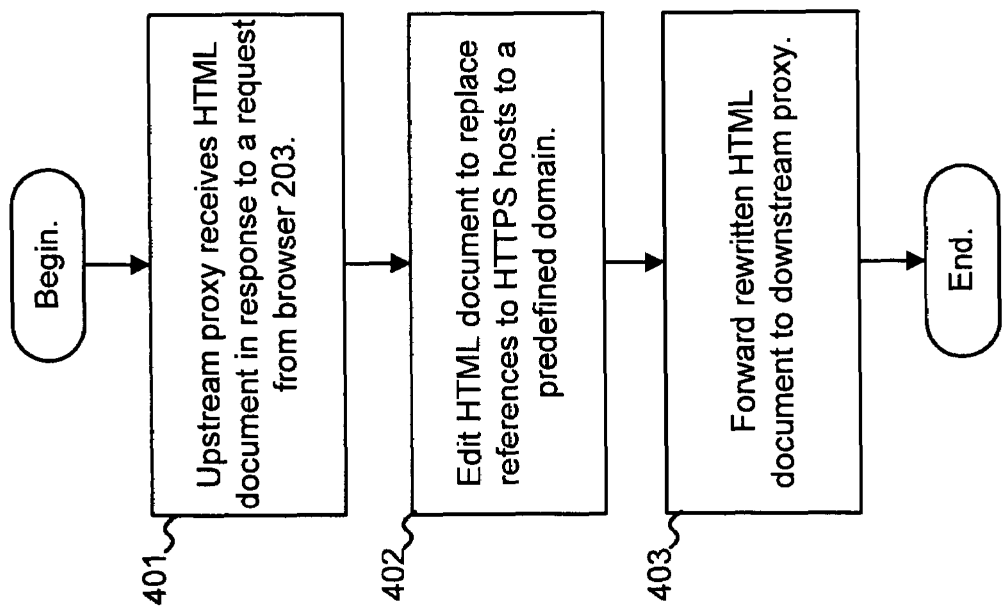
FIG. 4 is a flow chart illustrating an exemplary operation of the proxy servers shown in FIG. 2 when processing web pages with HTTPS links.

FIG. 4 is an exemplary flow chart illustrating operation of the proxy servers when processing web pages with HTTPS links. Upstream proxy server 207 may receive a web page (e.g., an HTML document) from web server 209 in response to a request from browser 203 (act 401). The web page, in addition to being a simple HTML page, may be or include more complicated formatting structures, such as Javascript or cascading style sheets. Upstream proxy server 207 may rewrite (edit) the web page to replace references to HTTPS domains to a predefined domain, as described in more detail below (act 402). The predefined domain may be a domain under control of the entity providing network connectivity through WAN 211, such as the provider of the network connection over satellite 301. The rewritten version of the web page may be forwarded to downstream proxy 205, which may eventually forward it to browser 203 (act 403).

The web page rewriting performed in act 402, although described as being performed by upstream proxy server 207, could potentially, in other implementations, be performed by other devices, such as by downstream proxy server 205.

Figures 5A, 5B:
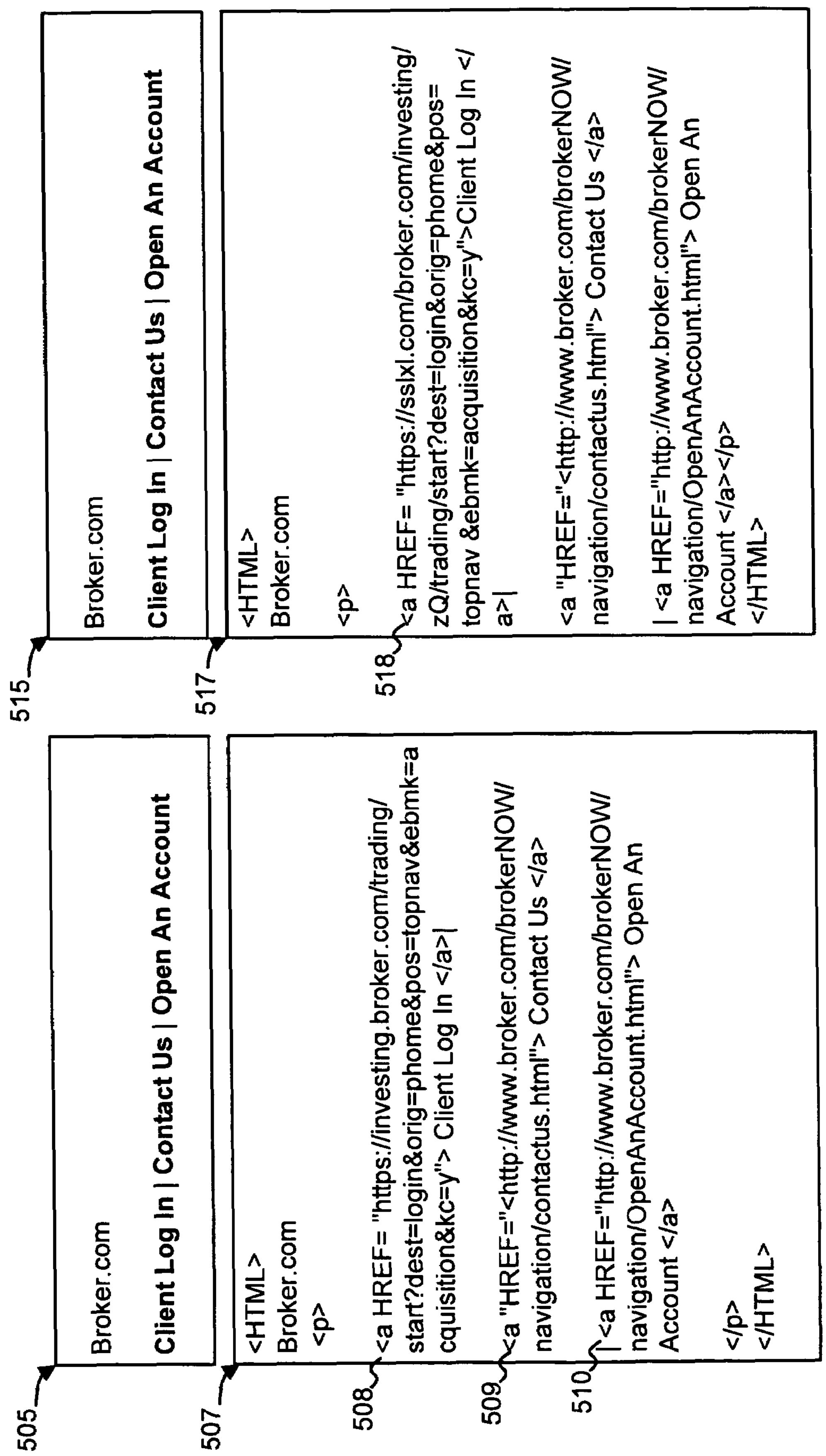
FIG. 5A is a diagram illustrating an exemplary web page before rewriting of links.
FIG. 5B is a diagram illustrating an exemplary web page after rewriting of links.

FIGS. 5A and 5B are diagrams illustrating an exemplary web page before (FIG. 5A) and after (FIG. 5B) the rewriting performed in act 402. As shown in FIG. 5A, a simple login page 505 is illustrated for a hypothetical web site "Broker.com." The rendered version of the login page includes three links: a "Client Login" link, a "Contact Us" link, and an "Open An Account" link.

HTML code 507 corresponding to login page 505 is also shown in FIG. 5A. The three links in login page 505 are implemented in HTML code 507 using HREF tags 508, 509, and 510. Each HREF tag 508-510 includes a reference to the URL associated with the link and a textual description of the link. The URL for HREF tag 510, for instance, is: "http://www.broker.com/brokerNOW/navigation/OpenAnAccount.html." When the user selects the link "Open An Account," the user's browser requests the web page "OpenAnAccount.html" from the host "www.broker.com."

The links associated with HREF tags 509 and 510 specify standard (non-secure) HTTP connections. The link associated with HREF tag 508, however, specifies that the connection should be established as a secure HTTPS connection. Accordingly, when a user selects the "Client Log In" link to login to their brokerage account, a secure session should be established.

FIG. 5B illustrates a version of login page 505 and HTML code 507, labeled as login page 515 and HTML code 517, respectively, after being rewritten according to act 402. Login page 515 is visually identical to login page 505. In HTML code 517, however, the URL for HREF tag 518 has been rewritten such that the predetermined domain "sslxl.com" has been inserted into the URL. The remainder of the URL is mostly unchanged, although the web server "investing" is moved to a position directly after the domain "broker.com". Additionally, a unique identifier, such as the text "zQ," was added to HREF tag 518. This unique text clearly identifies to the proxy servers that the page has been edited. In other implementations, other changes to the URL could be made.

More generally, the URLs are rewritten according to act 402 to redirect the request to the domain name of the secure agent (e.g., from secure web server 210 to downstream proxy 205) wherein the rewritten URL encodes the original URL. In some implementations, the rewritten URL could be an HTTP request instead of an HTTPS request. The links shown in FIGS. 5A and 5B are URLs that are written as "absolute" URLs. The text of an absolute URL specifies contains a complete reference to the specified content. In addition to absolute URLs, web documents may contain "relative" and "absolute relative" URLs. In general, relative URLs are abbreviated versions of the absolute URL. That is, in a document with a given URL, a relative URL can be used to give the URL of another document relative to the URL of the current document. When rewriting absolute relative URLs in act 402, the absolute relative URL may first be converted back to its absolute URL and then rewritten based on the absolute version of the URL.

It can be appreciated that the operations for rewriting HTTPS links are generally transparent to a user surfing the Web via browser 203. That is, the rewritten URLs do not change the rendered version of the web page. At some point, the user may request a secure web page via one of the rewritten HTTPS connections. FIGS. 6-9 illustrate the operation of system 300 in response to such a request for a secure web page.

Figure 6A:
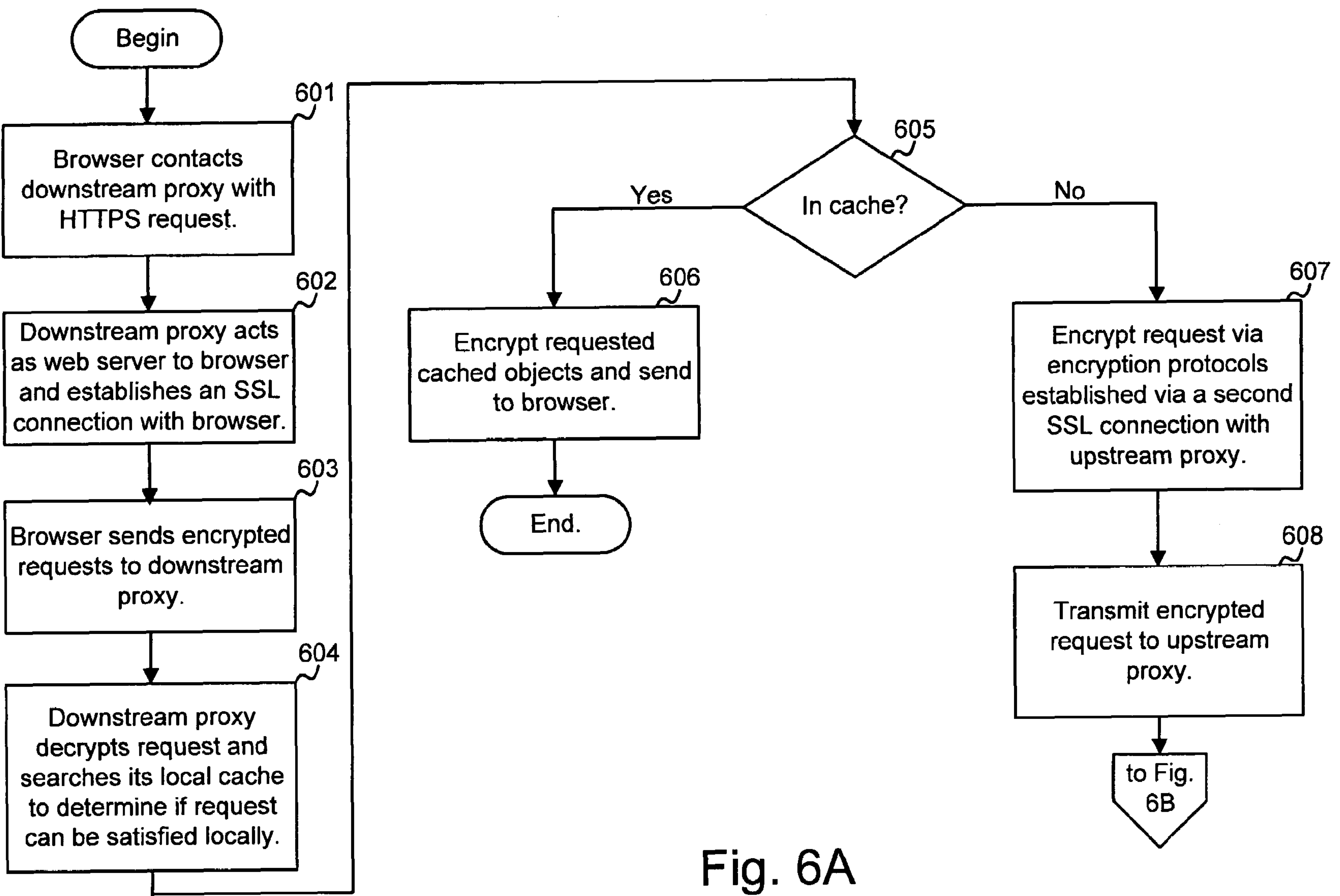
FIGS. 6A and 6B are flowcharts illustrating exemplary operations for responding to an HTTPS request.
Figure 6B:
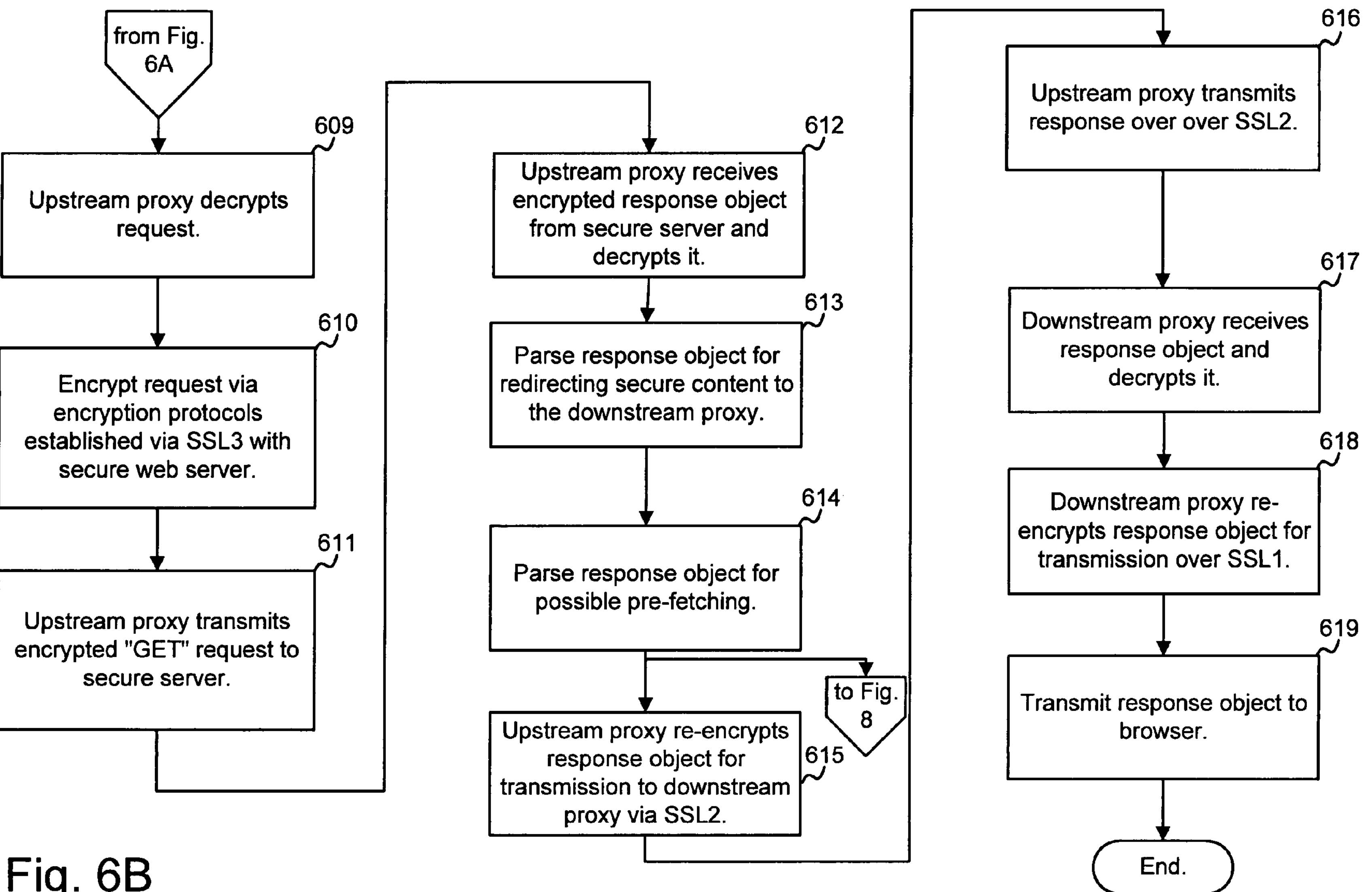

FIGS. 6A and 6B are exemplary flowcharts illustrating operations consistent with aspects of the invention for responding to an HTTPS request.

In response to the user selecting a link to a secure web site, browser 203 may contact downstream proxy 205 with the HTTPS request (act 601). As will be described in more detail below, the rewritten predetermined domain (e.g., "sslxl.com") may refer to downstream proxy 205 as the host that is to handle the secure HTTPS connection. That is, from the standpoint of browser 203, the secure link (e.g., link 518) is with downstream proxy server 205. Browser 203 and downstream proxy server 205 may thus establish an SSL connection with one another (act 602). In this implementation, downstream proxy server 205 acts as a trusted agent through which browser 203 initiates secure connections. In other implementations, the rewritten predetermined domain may refer to a device other than downstream proxy server 205 as the trusted agent.

Figure 7:
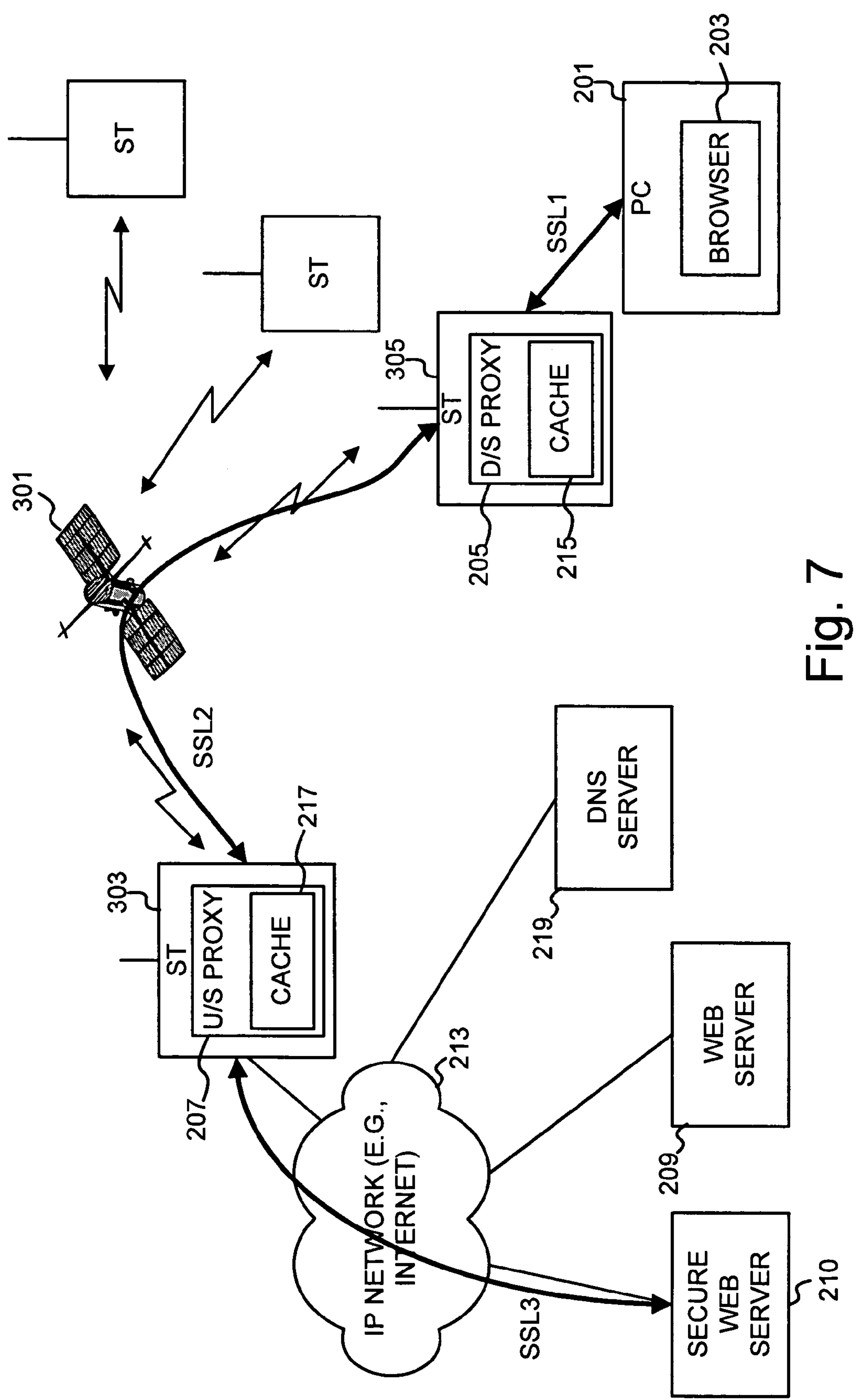
FIG. 7 is a diagram of an exemplary satellite communication system.

FIG. 7 is a diagram of a satellite communication system similar to that shown in FIG. 3. In FIG. 7, SSL connections formed between browser 203 and secure web server 210 are also illustrated. The SSL connection formed in acts 601 and 602 is shown as connection "SSL1." Additional independent SSL connections, "SSL2" and "SSL3" may be established between downstream proxy 205 and upstream proxy 207, and between upstream proxy 207 and secure web server 210. The complete connection formed by the combination of SSL1, SSL2, and SSL3 allows data to be securely transmitted between secure web server 210 and browser 203. The particular secure web server 210 with which SSL3 is formed is determined from the encoded portion of the link in the original HTTPS after the inserted predetermined domain. Taking link 508/518 as an example, upstream proxy server 207 would establish an SSL connection with the host "investing.broker.com" and send a request for the page: "/trading/start?dest=login&orig=phome&pos=topnav&ebmk=acquisition&kc=y".

One of ordinary skill in the art will recognize that the connection between upstream proxy server 207 and downstream proxy server 205 ("SSL2") does not necessarily need to use the SSL protocol. Other secure protocols may be used.

Alternatively, the connection between upstream proxy server 207 and downstream proxy server 205 may be deemed to be inherently secure or secure enough. In these situations, the link SSL2 may be replaced with an unencrypted link. Similarly, the connection between upstream proxy server 205 and browser 203 may, in some implementations, use different secure or unsecure protocols.

Browser 203 may request data over the SSL connection, such as browser requests using the "GET" command (act 603). These requests are sent to downstream proxy 205. Downstream proxy 205 may determine whether it can satisfy the request from its local cache 215 (acts 604 and 605). If the request can be satisfied from cache 215, the requested objects may be read from the cache, encrypted, and sent back to browser 203 over the encrypted link SSL1 (act 606).

If the request cannot be satisfied from cache 215, the request object is re-encrypted for transmission over SSL2 (act 607). The request object may then be transmitted over SSL2 (act 608). Referring to FIG. 6B, upstream proxy 207 may receive and decrypt the request (act 609). Upstream proxy 207 may then encrypt the request using the encryption protocols established with secure web server 210 over the SSL3 connection (act 610). Upstream proxy 207 may then transmit the encrypted request object (e.g., a GET request) to secure web server 210 over the SSL3 connection (act 611).

Secure web server 210 will normally respond to the request object and provide the requested object. Upstream proxy 207 receives the encrypted response, decrypts it (act 612), and parses the response object for redirecting to the appropriate downstream proxy server 205 (act 613). The response object may then be processed for possible pre-fetching (act 614). The pre-fetching of the plaintext response objects may be performed as previously discussed and as described in more detail in the commonly assigned application "SYSTEM AND METHOD FOR PRE-FETCHING CONTENT IN A PROXY ARCHITECTURE," previously incorporated by reference herein. Techniques other than parsing may also be used for anticipating resources to pre-fetch. For example, historical knowledge of browsing patterns or a predetermined list of resource URLs may be used to attempt to anticipate objects that the user will later request.

Upstream proxy 207 may then forward the response object to browser 203 via SSL2 and SSL1. More particularly, upstream proxy 207 may re-encrypt the response object and transmit it over SSL2 (acts 615 and 616). Downstream proxy 207 receives the response object and decrypts it (act 617). The response, as well as other pre-fetched responses received from upstream proxy 207, may be stored in cache 215. Downstream proxy 205 may re-encrypt the response object and transmits it over SSL1 to browser 203 (acts 618 and 619). The browser then display the response object (e.g., a web page or portion of a web page) to the user. From the point of view of the browser, a single, normal SSL connection was established and encrypted data received over the SSL connection. However, because the connection actually included points in the proxies at which the data is in a plaintext form, content parsing and pre-fetching can be performed.

Figure 8:
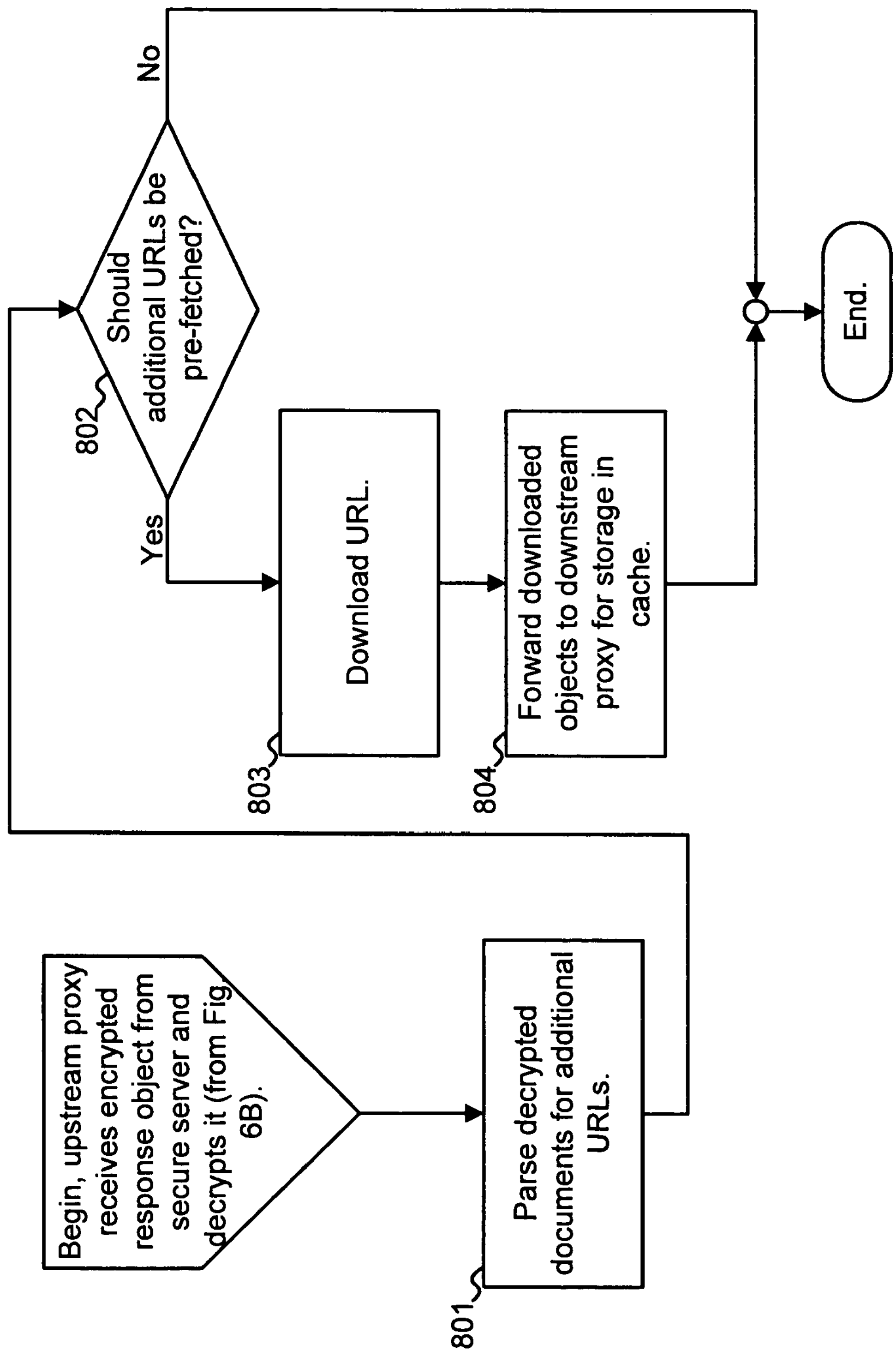
FIG. 8 is an exemplary flowchart illustrating pre-fetching.

FIG. 8 is an exemplary flowchart illustrating pre-fetching, as performed in act 613, in additional detail. To begin, upstream proxy 207 may receive and decrypt encrypted objects from secure web server 210, as previously discussed with reference to act 612 (FIG. 6). The response objects may be HTML documents. The plaintext (decrypted) version of these may be processed for the presence of additional URLs (act 801). For example, a web page relating to a user's brokerage account may include numerous additional URLs, such as URLs relating to the user's balance, trading history, etc. The URLs may be associated with, for example, cascading style sheets, javascript, embedded images, or other web page pages. Upstream proxy 207 may determine that some or all of these URLs are likely to be selected by the user in the future. Rather than wait for the user to request these URLs before getting them from the web server, upstream proxy 207 may determine that these URLs are good candidates for pre-fetching, (act 802), and download the URLs from the web server (act 803). The downloaded data objects may then be encrypted and forwarded, via SSL2, to downstream proxy 205 (act 804). The downstream proxy may store the data objects in its cache 215. The downstream proxy server 205 can then deliver a pre-fetched URL to the browser 203 immediately, in response to a request from browser 203 that corresponds to a pre-fetched URL, if the URL was delivered to the downstream proxy server 205, for example, less than a configurable expiration timeout (e.g., default of 30 sec.) prior to the downstream proxy server 205 receiving the browser's request. As previously mentioned, URLs to pre-fetch may be determined using techniques other than parsing the document, such as historical information relating to browsing patterns.

Figure 9:
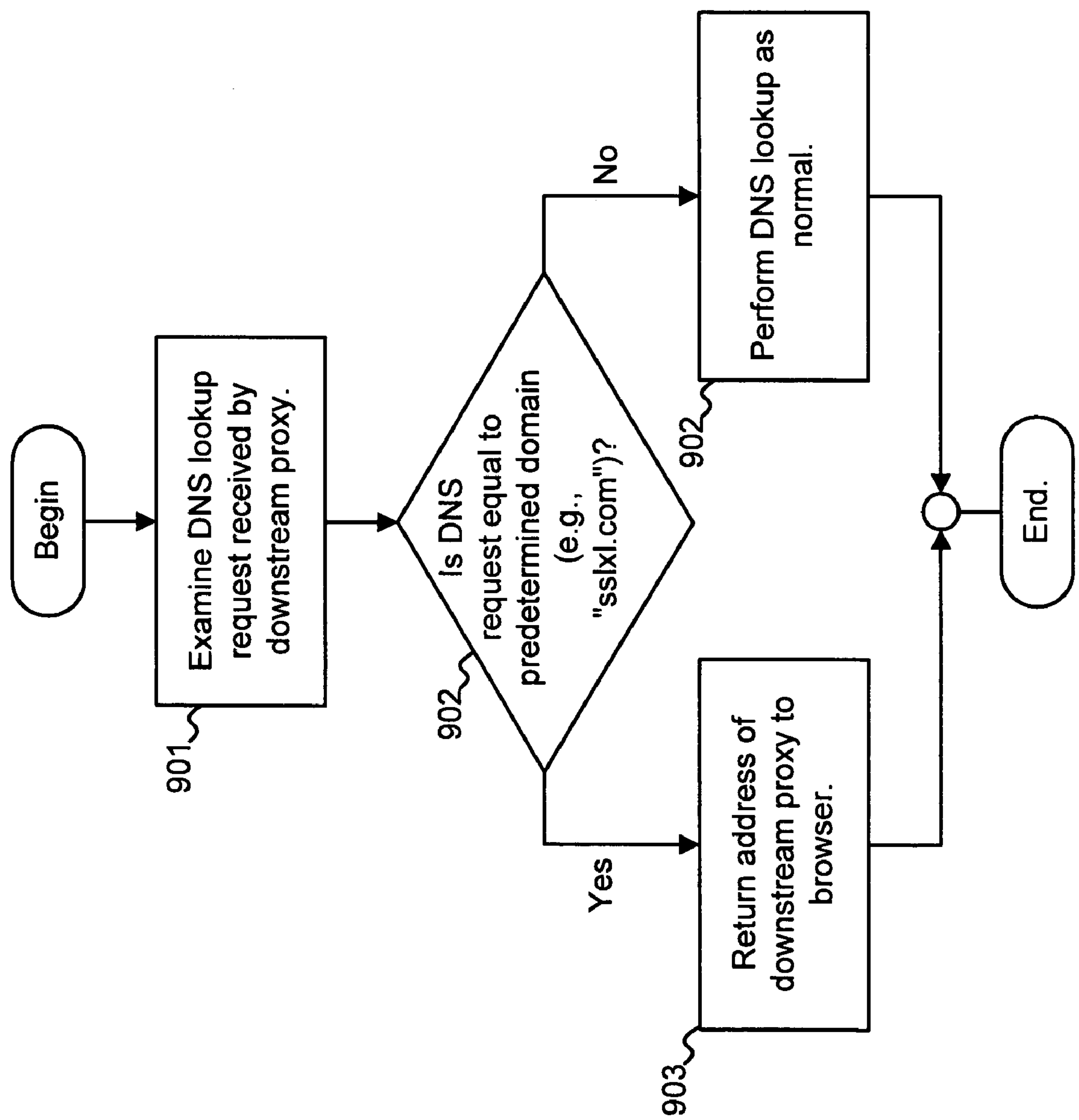
FIG. 9 is an exemplary flowchart illustrating operations for performing domain name lookups.

FIG. 9 is a flowchart illustrating operations for performing domain name lookups consistent with aspects of the invention. The Internet Domain Name Server (DNS) system refers to a distributed domain of servers that map domain names to the official Internet Protocol addresses. The fictional domain "broker.com" may map to an official Internet protocol address such as 66.34.114.5. The Internet protocol address is used by IP network 213 for directing packet data to its final destination. Browsers, when fetching a link requested by the user, may begin by initially querying the DNS system to obtain the Internet protocol address corresponding to the domain name.

Downstream proxy 205 may examine DNS lookup requests sent by browser 203 (act 901). If the DNS lookup request is a request corresponding to the domain for the predetermined domain used to rewrite the HTTPS requests (e.g., "sslxl.com"), downstream proxy 205 may return the address of the downstream proxy browser 203 (acts 902 and 903). In this situation, the DNS lookup request is not further forwarded to IP network 213. When, however, the DNS lookup request does not correspond to the domain for the predetermined host, downstream proxy may process the DNS request as normal (act 902 and 904). That is, in this situation, downstream proxy may forward the request to a DNS server, such as DNS server 219 (FIG. 2).

By intercepting DNS requests in this manner, downstream proxy 205 ensures that the SSL connections initiated by browser 203 for rewritten SSL domains will be initiated with downstream proxy 205.

Cookie Handling

Cookies are a commonly used technique through which a web server provides customized content to a browser. Cookies may include information such as login or registration identification, user preferences, online "shopping cart" information, etc., that is sent from a web server to a browser using the "Set-Cookie" response header. The browser saves the information (the cookie), and sends it back to the web server whenever the browser returns to the web site. The web server may use the cookie for a number of different purposes, such as to customize the display it sends to the user, or to keep track of the user's surfing pattern while at the web site of the web server.

A browser returns cookies to web servers based on domain and path attributes sent with the Set-Cookie response header. For example, a cookie may be associated with a domain attribute and a path attribute by the web server that creates the cookie. The domain attribute defines to which servers the cookie should be returned and the path attribute defines the beginning of a path. A browser sends a cookie to the server whenever the URL being requested by the browser matches both the cookie's domain and path attributes.

The domain attribute typically refers to an individual server, for example, the domain attribute "www.abc.com" refers to the server "www" at the domain "abc.com." The domain attribute, however, can also refer to any of multiple servers within an enterprise's domain. For example, when the domain attribute is set to "abc.com," the browser will send the cookie to any server within the "abc.com" domain, such as "www.abc.com," "home.abc.com," and "images.extra.abc.com."

Processing web pages with HTTPS links to edit the links, as previously described, can create problems with cookies, because, to the browser, the edited web pages all appear to be from a single web server (e.g., sslxl.com).

Figure 10:
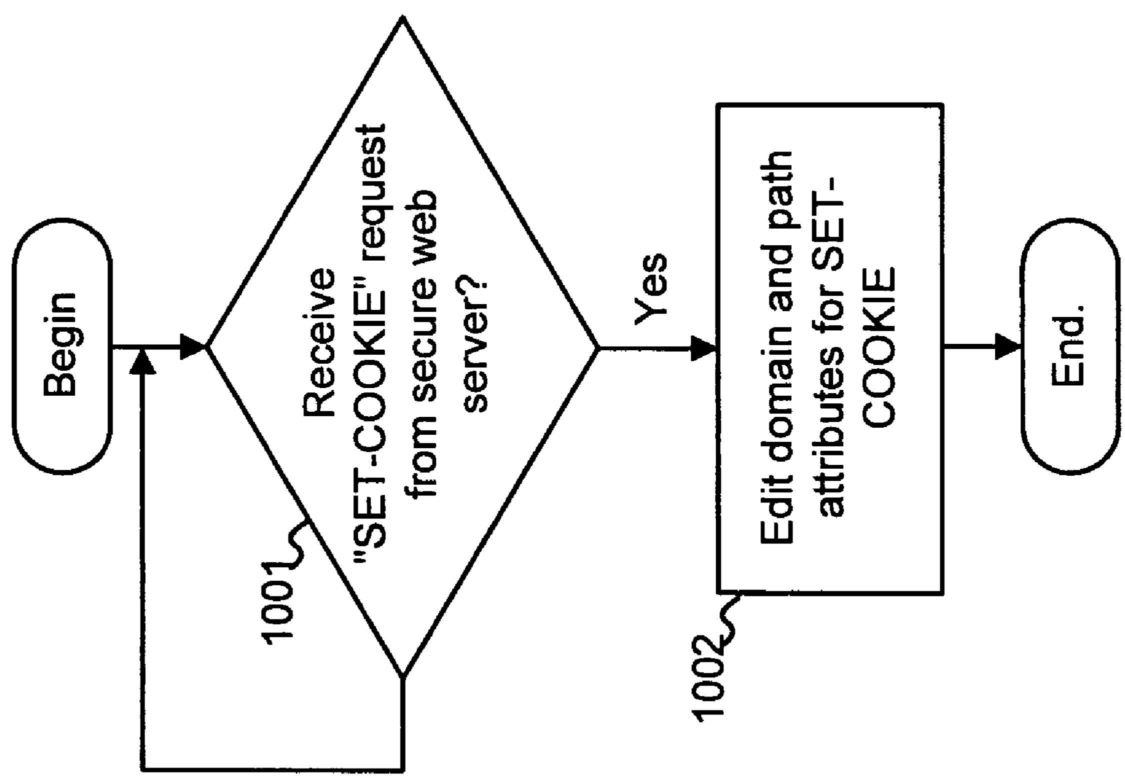
FIG. 10 is an exemplary flowchart illustrating cookie handling.

FIG. 10 is a flowchart illustrating cookie handling according to one implementation. Downstream proxy 205 or upstream proxy 207 may examine responses sent from secure web server 210 and scan them for "SET-COOKIE" headers (act 1001). When a "SET-COOKIE" header is received, the proxy may edit one or both of the domain and path attributes in the header (act 1002). In general, because the browser believes that all HTTPS requests are being handled by the edited predetermined domain, such as sslxl.com, the domain field of the SET-COOKIE request is not useful to the browser. Accordingly, the domain field may be removed in act 1002 from the SET-COOKIE request. The path field may be edited to include both the path and the domain from the original SET-COOKIE request.

As an example of act 1002, consider the rewritten HTTPS link 518 (FIG. 5B). The path portion of rewritten link 518 may be "broker.com/investing/zQtrading/". Accordingly, if a SET-COOKIE request specified the server and domain "investing.broker.com" and the path "/trading/", the SET-COOKIE request would be written to remove the domain and set the path to "broker.com/investing/zQ/trading/". As another example, if the SET-COOKIE request did not include a domain attribute but specified the path as "/trading/", the path would also be rewritten to "broker.com/investing/trading/", which reflects the implicit server and domain implied by the original SET-COOKIE request. As yet another example, if the SET-COOKIE requests includes the domain "broker.com" and a path "/trading/", the domain would be removed and the path set to "broker.com." In this situation, the cookie will be supplied to any request into the domain "broker.com," even when it was not specifically requested by the SET-COOKIE request.

There may be situations when a browser receives cookies while accessing a non-secure web page and where the browser is expected to provide these cookies when accessing a secure web page. This can occur, for example, as the user moves from a non-secure to a secure web page as part of a web site "logging in" process. Without special processing in this situation, the browser will not return the cookies to the secure web site because, from the point of view of the browser, the secure web site is in a different domain (e.g., sslxl.com).

Figure 11:
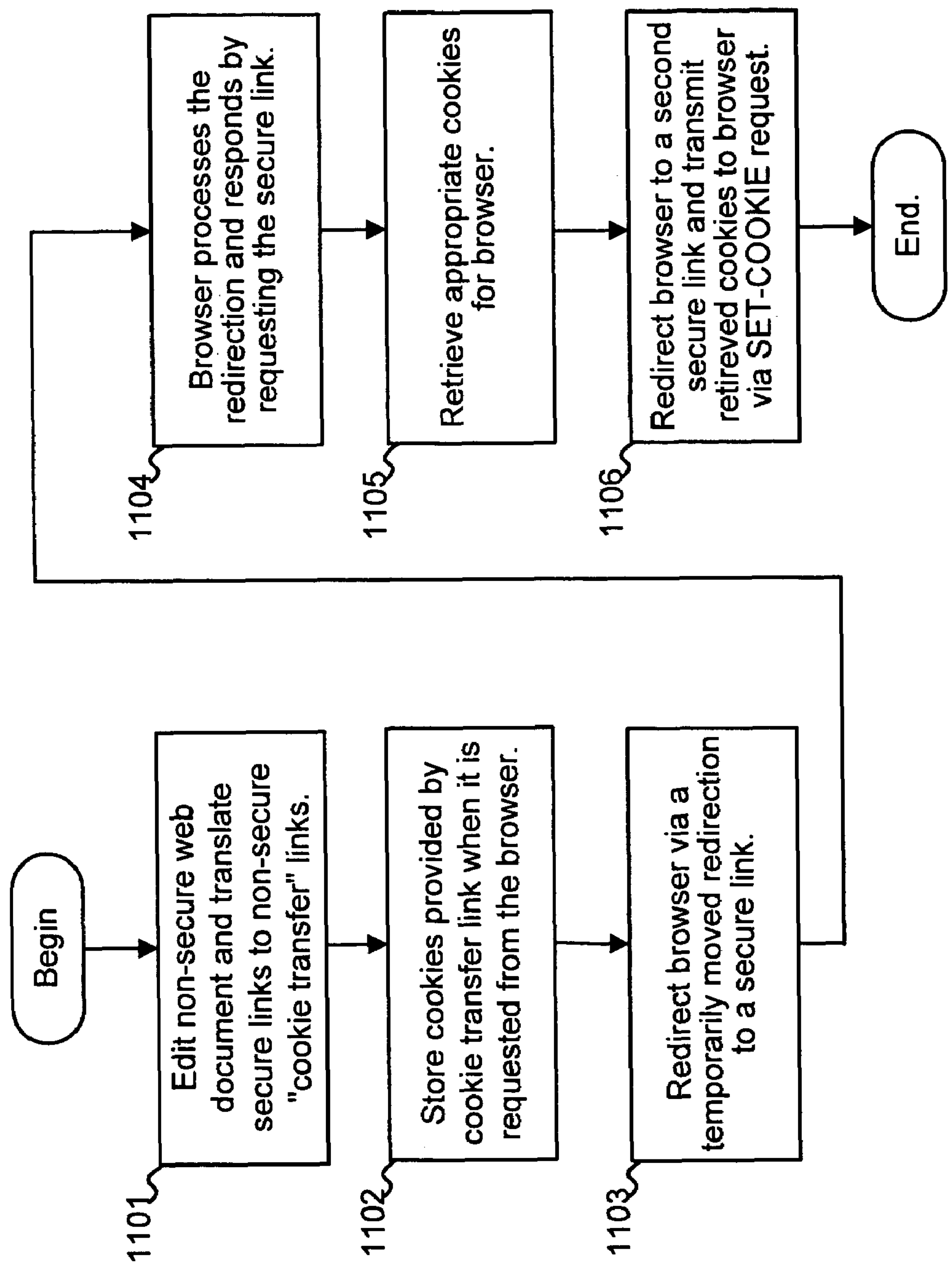
FIG. 11 is an exemplary flowchart illustrating transfer of cookies from a non-secure to a secure connection.

FIG. 11 is a flowchart illustrating cookie transfer consistent with an aspect of the invention for handling transfer of cookies from a non-secure to a secure connection. The proxy server may receive a web document with a secure link and may determine that the link is one for which it is likely that the browser is expected to provide cookies from a non-secure site to the secure site. If so, the proxy server may edit the web document to replace the secure link with non-secure link (act 1101). The non-secure link may include a special value that will allow the proxy server to later determine that the link is subject to linked cookie transfer. For example, a string such as "cookietransfer" may be inserted into the path of the new link.

At some point, the user may select the link edited in act 1101. The proxy server may recognize the requested link as a cookie transfer link by virtue of the special value in the link, such as the string "cookietransfer" in the path. The proxy server may store all of the cookies provided with the request in a cache, such as cache 215 (act 1102). The proxy server may then redirect the browser via a 302 temporarily moved operation to a secure link (act 1103). This secure link may include the predetermined domain (e.g., ssxlx.com) and may include an indication that that it is part of a cookie transfer.

The browser may process the redirection and respond by requesting the secure link (act 1104). The proxy server may then retrieve any appropriate cookies for the browser from the cache (act 1105) and again redirect the browser via a 302 temporarily moved operation to a second secure link, such as a re-written secure link as described above (e.g., link 518) (act 1106). Additionally, with the second secure link, the proxy server may return the cookies retrieved from the cache via the SET-COOKIE request to the browser. The path in the SET-COOKIE request is set to match any server whose domain would have matched the cache entry's domain field.

In summary, by virtue of the acts of FIG. 11, and through the use of a cache at the proxy server and a number of redirect requests, the cookies from the non-secure page are effectively transferred to the rewritten version of the secure web page.

CONCLUSION

Concepts were described above by which a trusted agent handles secure connections on behalf of a client device. URLs sent to the client device may be rewritten in such as manner that the operation of the trusted agent is transparent to the operation of the client. The trusted agent may additionally employ pre-fetching techniques to enhance the performance of the system. The concepts are particularly applicable to high-latency networks, such as satellite networks.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with respect to FIGS. 4, 6A, 6B, 8, and 9, the order of the acts may be modified in other implementations consistent with the present invention. Moreover, non-dependent acts may be performed in parallel.

As an additional example, although the link between the client and the upstream proxy were described as a secure SSL connection, in some implementations, these links may be implemented with other encryption techniques or these links may be determined to be inherently secure enough, in which case data across these links may not be encrypted. In the latter case, in particular, the upstream proxy may act as the trusted agent by rewriting all HTTPS request to corresponding HTTP requests. The upstream proxy may then convert the HTTP requests received from the client to HTTPS requests that the upstream proxy can use to contact the secure content server.

In addition, while present invention has been described mainly with respect to satellite networks, it should be understood that the techniques described herein are also applicable to non-satellite networks.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A method for retrieving content for a client comprising:

receiving a reference to secure content accessed via a first resource;

editing the reference to the secure content to redirect requests for the secure content to a trusted agent, the edited reference to the secure content including information that identifies the first resource and the secure content of the received reference;

forwarding the edited reference to the client; and requesting the secure content from the first resource, by the trusted agent on behalf of the client, when the client requests the edited reference.

2. The method of claim 1, wherein the secure content is web content.

3. The method of claim 2, wherein editing the reference to the secure content includes inserting a first predetermined domain in the reference to the secure content.

4. The method of claim 1, further comprising:

returning, in response to domain name lookup requests received from the client for the first predetermined domain, an address of the trusted agent.

5. The method of claim 1, wherein the reference to the secure content is a HyperText Transfer Protocol (HTTPS) link.

6. The method of claim 1, wherein the secure content is accessed via a Secure Socket Layer (SSL) connection.

7. The method of claim 1, wherein the edited reference to the secure content includes all fields of the received reference.

8. The method of claim 1, wherein the trusted agent is implemented as first and second proxy servers in a satellite network.

9. The method of claim 1, further including:

receiving a request from the first resource to store cookies at the client; and editing domain and path attributes of the request to reference the first resource accessed via the trusted agent.

10. A device for retrieving content for a client comprising:

means for receiving a reference to secure content accessed via a first resource;

means for editing the reference to the secure content to redirect requests for the secure content to a trusted agent, the edited reference to the secure content including information that identifies the first resource;

means for forwarding the edited reference to the client; and means for requesting the secure content from the first resource, by the trusted agent on behalf of the client, when the client requests the edited reference.

11. The device of claim 10, wherein the secure content is web content.

12. The device of claim 11, wherein the means for editing the reference to the secure content inserts a first predetermined domain in the reference to the secure content.

13. The device of claim 10, wherein the reference to the secure content is a secure HyperText Transfer Protocol (HTTPS) link.

14. The device of claim 10, wherein the secure content is accessed via a Secure Socket Layer (SSL) connection.

* * * * *